United States Patent
Okayasu

(10) Patent No.: US 6,449,696 B2
(45) Date of Patent: *Sep. 10, 2002

(54) DEVICE AND METHOD FOR INPUT/OUTPUT CONTROL OF A COMPUTER SYSTEM FOR EFFICIENT PREFETCHING OF DATA BASED ON LISTS OF DATA READ REQUESTS FOR DIFFERENT COMPUTERS AND TIME BETWEEN ACCESS REQUESTS

(75) Inventor: Naoaki Okayasu, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,763

(22) Filed: Dec. 23, 1998

(30) Foreign Application Priority Data

Mar. 27, 1998 (JP) ............................................. 10-081677

(51) Int. Cl.[7] .......................... G06F 13/00; G06F 15/16
(52) U.S. Cl. ....................... 711/137; 711/147; 711/205; 709/203
(58) Field of Search ................................ 711/137, 118, 711/119, 121, 130, 213, 204, 205, 147; 709/203, 208; 712/237, 207

(56) References Cited

U.S. PATENT DOCUMENTS

| | | | | |
|---|---|---|---|---|
| 5,390,318 A | * | 2/1995 | RamaKrishnan et al. ... | 711/136 |
| 5,737,747 A | * | 4/1998 | Vishlitzky et al. .......... | 711/118 |
| 5,778,435 A | * | 7/1998 | Berenbaum et al. ........ | 711/137 |
| 6,023,726 A | * | 2/2000 | Saksena ...................... | 709/219 |
| 6,070,230 A | * | 5/2000 | Capps ......................... | 711/137 |
| 6,085,193 A | * | 7/2000 | Malkin et al. ................ | 707/10 |
| 6,092,154 A | * | 7/2000 | Curtis et al. ................. | 711/137 |
| 6,098,064 A | * | 8/2000 | Pirolli et al. .................. | 707/2 |
| 6,128,701 A | * | 10/2000 | Malcolm et al. ............ | 711/133 |

FOREIGN PATENT DOCUMENTS

| | | |
|---|---|---|
| JP | 61-175721 | 8/1986 |
| JP | 4-257039 | 9/1992 |
| JP | 4-369076 | 12/1992 |
| JP | 6-332629 | 12/1994 |
| JP | 7-104940 | 2/1995 |

* cited by examiner

*Primary Examiner*—Glenn Gossage
(74) *Attorney, Agent, or Firm*—Staas & Halsey LLP

(57) ABSTRACT

An apparatus including an input/output control device and an associated method are disclosed. The method includes a list with read requests recorded therein in the order of generation thereof is provided for each client, and a read request from a client is added to an end of a list for the client, when the request is generated within a specified period of time after generation of the previous read request from the same client. When the request is generated after passage of the specified period of time, it is added to a header of a new list. Common sections of the two lists are recorded in a common table, and information instructing to refer to the common table is inserted into the lists in place of the common sections in the lists. Data is prefetched from the disk device and stored in a cache memory based on the content of the lists. Data corresponding to common sections between the two lists may be relocated or written in a continuous empty area of the disk device in a continuous state.

21 Claims, 13 Drawing Sheets

FIG.4
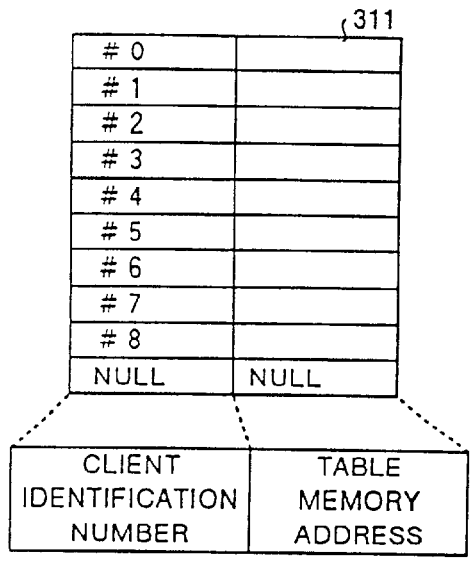
FIG.5A
TABLE FOR WS1
| CLIENT IDENTIFICATION NUMBER=#0 | |
|---|---|
| LAST ACCESS TIME | |
| 1 | |
| 10 | |
| 100 | |
| NULL | NULL |
FIG.5B
TABLE FOR PC1
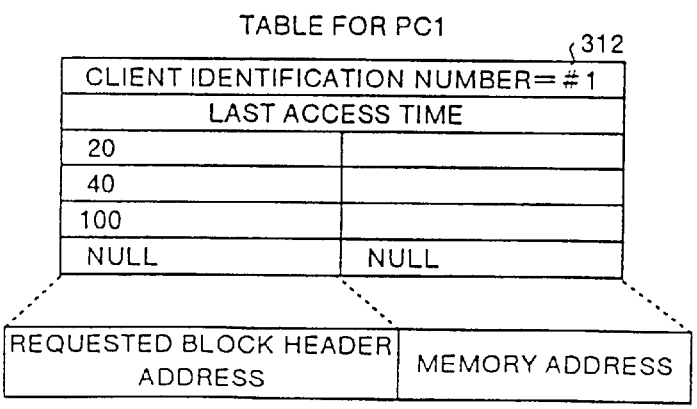

BEFORE RELOCATION OF COMMON DATA

AFTER RELOCATION OF COMMON DATA

DEVICE AND METHOD FOR INPUT/OUTPUT CONTROL OF A COMPUTER SYSTEM FOR EFFICIENT PREFETCHING OF DATA BASED ON LISTS OF DATA READ REQUESTS FOR DIFFERENT COMPUTERS AND TIME BETWEEN ACCESS REQUESTS

BACKGROUND OF THE INVENTION

1. Field of the Invention

The present invention relates to an electronic computer system and more specifically to a method and device for control of the electronic computer system which results in efficient prefetching of data.

2. Description of the Related Art

With the advent and proliferation of computer systems having a client-server architecture, the size of electronic computers is being reduced relative to the size of previous-generation, general-purpose computers. In client-server systems, the client computers typically include personal computers (PCs), and the management cost for managing the client-server system must be re-estimated to take into account the cost of managing each personal computer (herein after referred to as PC). To reduce the management cost for PCs, a system is employed in which application software or user data is stored in the server and each PC (in its role as a client) accesses the server to use the application software or data stored therein. The server and the PCs are interconnected by network, and are referred to collectively as a network computing system.

In the network computing system as described above, and in most electronic computer systems built around a server, it appears to each client computer (or PC) that the application software or the user data being accessed is stored in or on the hard disk of the respective PC. Also in the network computing system described herein above, a disk sub-system may be connected to the server and a hard disk device of this sub-system may used as a cache.

The performance of a computer system as a whole largely depends on the access speed to the frequently used application software or user data, and particularly to the input/output (IO) performance of a disk sub-system storing the application software or user data. In this system, data is read from the disk device of the disk sub-system and stored in the cache. However, to speed up processing, if the data is already stored in the cache when the access request for the data is made, the data is read directly from the cache.

The above described method is referred to as prefetch processing. Japanese Patent Laid-Open Publication No. SHO 61-175721 discloses prefetch processing in detail. More particularly, the foregoing publication describes an input/output control device capable of prefetching data to be read out, in which an input/output operation request issued by a central processing unit to the input/output control device is statistically analyzed, data is read from an auxiliary storage device of the central processing unit and stored in a built-in, high speed storing unit of the input/output control device. The reading of the data is performed based on information concerning files stored in an auxiliary storage device determined by the central processing unit and on the result of the already mentioned statistical analysis. By doing this, the required data is kept ready in the high speed storing unit at the point in time when a request for reading the data is issued from the central processing unit to the input/output control device. Accordingly, an input operation can be completed within a shorter period of time because the data does not have to be read from the auxiliary storage device in association with a request for the input operation.

Japanese Patent Laid-Open Publication No. HEI 6-332629 discloses a signal processing unit exclusively for magnetic disks. This unit comprises sections such as an access address detection/determination circuit, a buffer control circuit, and a main control section. The access address detection/determination circuit determines whether access to successive addresses on a magnetic disk is made or not and also counts the addresses. The buffer control circuit reads data stored on the magnetic disk regardless of whether a host command has been issued. The main control section determines whether the read data is to be sent to an upper (such as a host) level device while simultaneously storing the data in a data buffer or the read data is to be sent to an upper level device without storing the data in the data buffer and issuing an instruction according to the determination. The main control section also has an access optimizing control function executing statistical analysis of the selecting operation in each of the other sections in response to an access from an upper device, and selects and adapts an optimal control method for access from an upper device based on a result of the above statistical processing.

Further, Japanese Patent Laid-Open Publication No. HEI 7-104940 discloses a disk device. This device includes a reading unit, a transfer unit, an inferring unit, a prefetching unit, a storing unit, and a control unit. The reading unit reads the data recorded on a disk according to a command received from a host control unit. The transfer unit transfers the read data to the host control unit. The inferring unit infers a read command which the host control unit might issue next. The prefetching unit prefetches the data from the disk based on the output of the inferring unit. The storing unit stores the data read by the prefetching unit and/or the reading unit. The control unit controls the disk device its entirety.

The inferring unit includes a first determining unit that determines whether a command received previously and a currently-received command are read commands, and a second determining unit that determines whether there is continuity between an ending address of the previous read command and a beginning (or header) address of a current read command. The host control unit infers a read command to be transmitted next and a beginning address of the read command according to a result of determination by the first and second determining units.

In association with the recent scale-up of application software, a number of input and output (hereinafter referred to as I/O) requests are simultaneously and concurrently issued from a plurality of clients connected to a server, and an increasingly larger number of I/O requests for execution modules are reported to a disk device residing on the server side of the client-server computer system. Accordingly, a processing algorithm enabling efficient processing in a device which controls the disk device is needed.

A hit ratio of data stored in a cache is dependent whether the data is prefetched regularly or based upon estimates. In the input/output control device disclosed in Japanese Patent Laid-Open Publication No. SHO 61-175721, however, the type of analytical methods used to analyze the I/O operation requests issued from the central processing unit to the I/O control device are unclear, as is whether the data is prefetched regularly or based upon estimates. For this reason, whether a sufficient hit ratio for data stored in the cache can be obtained is ambiguous.

In the signal processing unit disclosed in Japanese Patent Laid-Open Publication No. HEI 6-332629 discussed earlier, as well as in Japanese Patent Laid-Open Publication No. HEI 7-104940, since data at successive addresses is prefetched and stored in the cache, a requested reading of data requiring prefetching data stored at non-successive addresses cannot be executed effectively, and a sufficient hit ratio is not obtained.

Also, in the disk device disclosed in Japanese Patent Laid-Open Publication No. HEI 7-104940, data stored at successive addresses is prefetched and stored in the cache, a requested reading of data issued requiring prefetching data stored at non-successive addresses cannot be executed effectively, and a sufficient hit ratio is not obtained.

Even if data stored at non-successive addresses are prefetched on the basis of some sort of regularities or estimations, time is required for reading ahead to skip to a non-successive address, namely a seek time is generated, so that data cannot efficiently be prefetched, and high speed reading of data by prefetching may not be realized.

SUMMARY OF THE INVENTION

The present invention was made in the light of the circumstances as described above.

It is an object of the present invention to provide an input/output control device that prefetches data efficiently regardless of the succession of the addresses.

It is another object of the present invention to provide a method of estimating which addresses are storing data that is to be prefetched when prefetching data is stored at not-successive addresses.

It is still another object of the present invention to provide an input/output control method of prefetching the data at a high speed without generating a seek time when prefetching data stored at non-successive addresses.

To achieve the objects described above, the present invention comprises an input/output control device controlling transactions of data between a mainframe electronic computer with various slave devices and a storage device storing therein data connected thereto. The input/output control device of the present invention comprises a list with data read requests from each slave device recorded therein according to an order of generation of the requests. The input/output control device of the present invention further comprises an access time determining section, a list adding section, a header registering section, a cache memory, and a cache transfer section.

The access time determining section determines when it receives a data read request from a slave device, whether a specified period of time has passed since the generation of a previous data read request from the same slave device. The list adding section adds a data read request generated within a specified period of time after generation of a previous data read request made from the same slave device to the end of the list for the slave device. The header registering section registers at a header of a new list, a data read request generated after a specified period of time has passed from the generation of a previous data read request from the same slave device. The cache memory stores therein data stored in the storage device. The cache transfer section transfers data from the storage device to the cache memory. In addition, the input/output control device of the present invention stores the data in the cache memory by prefetching the data according to the list.

With the above-mentioned input/output control device of the present invention, a list is provided for each slave device recording therein data read requests from respective slave devices according to the order of generation of the requests, and data is prefetched based on this list, so that it is possible to guess the data stored at non-successive addresses as an object for prefetching, and data can be prefetched regardless of the succession of addresses.

In addition, a data read request generated within a pre-specified period of time from generation of a previous data read request from the same slave device is added to an end of the list, while a data read request generated after passage of a prespecified period of time is registered at a header of a new list, so that it is possible to prefetch data for an appropriate number of blocks.

The input/output control device of the present invention comprises a common table and a common table preparing section. The common table records the common sections between at least two different lists. The common table preparing section prepares a common list at a specified time interval and inserts into the at least two different lists information referring to the common table in place of the common section in the at least two different lists.

With the above-mentioned input/output control device of the present invention, common sections between the two lists are stored in a common table. Therefore, not only the common sections are listed at places where the common sections are present in each list but also information is inserted referring to the common table, so common sections are not required to be redundantly stored, reducing the capacity required to store data as compared to the original list.

In the input/output control device of the present invention, the lists of the common table are stored in the storage device.

With the above-mentioned input/output control device of the present invention, the lists and the common table are stored in a device permanently storing data, so that data in the lists and common table are maintained even if the power of a mainframe electronic computer is turned off.

The input/output control device of the present invention further comprises an empty area managing section and a continuous data relocating section. The empty area managing section checks for a continuous empty area storage area in the storage device. The continuous data relocating section writes the data stored in the lists relating to the common section in a continuous empty area of the storage device in a continuous state.

With the above-mentioned input/output control device of the present invention, data corresponding to the common sections between lists is continuously relocated into a continuous empty area of a storage device by a relocating process, so that a series of data corresponding to the common sections is read out from the storage device at a higher speed than the series of data would have been read out if the data were not relocated but stored discreetly in a storage area of the storage device.

In another embodiment, the input/output control device of the present invention further comprises a second storage device connected to the mainframe electronic computer, an empty area managing section that checks for a continuous empty storage area in the second storage device, and a continuous data relocating section that writes the data stored in the lists relating to the common section in a continuous empty area of the second storage section in a continuous state.

With the above-mentioned input/out control device of the present invention, data corresponding to the common sections between the two lists are continuously written into a continuous empty area of a different storage device by a relocating process, so that a series of data corresponding to the common sections is read out from the storage device at a higher speed than the series of data would have been read out if the data had not been relocated but had been stored discontinuously in a storage area of the storage device.

The input/output control device of the present invention, therefore, comprises an input/output control device storing a list including data read requests from computers recorded therein according to an order of generation of the requests and determining whether to add a next data read request from one of the computers to the list corresponding to the one of the computers or to begin a new list, based upon whether the next data read request was made before a specified time had passed since the generation of a previous read request from the same computer, the input/output control device prefetching data according to the list.

In an input/output control method of the present invention, a plurality of slave devices and a storage device are connected to a mainframe electronic computer for executing data transactions between the storage device and the mainframe electronic computer. The method of the present invention comprises a step of determining, when a data read request is generated from a slave device, whether a specified period of time has passed since the generation of a previous data read request from the same slave device. The method of the present invention further comprises a step of adding to the end of a list data read requests generated within a specified period of time after generation of a previous data read request from the same slave device, the list including data read requests from the slave device recorded in the order of generation of the data read requests. In addition, the method of the present invention comprises a step of registering in the header of a new list data read requests each generated after passage of a specified period of time since generation of a previous data read request from the same slave device, the new list recording therein data read requests from the same slave device in the order of generation of the data read requests. Further, the method of the present invention comprises a step of transferring data to a cache memory by prefetching the data from the storage device based on the list.

With the above-mentioned method of the present invention, data is prefetched from a list which includes data read requests from each slave device recorded therein, respectively in an order of generation thereof, so that it is possible to guess the data stored at non-successive addresses as an object to be prefetched. Data can, therefore, be prefetched regardless of the succession of addresses.

In addition, a data read request generated within a pre-specified period of time after the generation of a previous data request from the same slave device is added to the end of the list, while a data read request generated after the passage of the prespecified period of time is registered in a header of a new list, so that data can be prefetched for an appropriate number of blocks.

The input/output control method according to the present invention further comprises a step of preparing a common table that records the common section between at least two different lists at a specified time interval and inserts into the lists information referring to the common table in place of the common section between the lists.

With the above-mentioned method of the present invention, common sections between the two lists are stored in a common table, and not only the common sections are listed at places in which the common sections were present in the original lists, but also information referring to the common table is inserted, so that the common sections are not redundantly stored. Accordingly, the amount of storage required to store the data is reduced compared to the amount of storage required to store the original list.

The input/output control method of the present invention further comprises a step of checking for a continuous empty storage area in the storage device and continuously writing the data stored in the lists relating to the common section in the continuous empty area of the storage device.

With the method of the present invention, data corresponding to the common sections between the lists is continuously written in a continuous empty area of a storage device by a relocating process, so that a series of data can be read out from the storage device at a higher speed compared to the data corresponding to the common sections stored in a discontinuous state in the storage device.

The method of an input/output control device of the present invention coupled to a computer, therefore, comprises storing a list including data read requests from computers recorded therein according to an order of generation of the requests, determining whether to add a next data read request from one of the computers to the list corresponding to the one of the computers or to begin a new list, based upon whether the next data read request was made before a specified time had passed since the generation of a previous read request from the same computer, and prefetching data according to the list.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a simulated diagram showing an example of a format of a client identification table prepared in an embodiment of the present invention;

FIGS. 5A and 5B are simulated diagrams showing an example of a format of a table for a client prepared in an embodiment of the present invention;

DESCRIPTION OF THE PREFERRED EMBODIMENTS

Detailed description is provided for embodiments of the method and device for input/output control according to the present invention, with reference to attached drawings.

Figure 1:
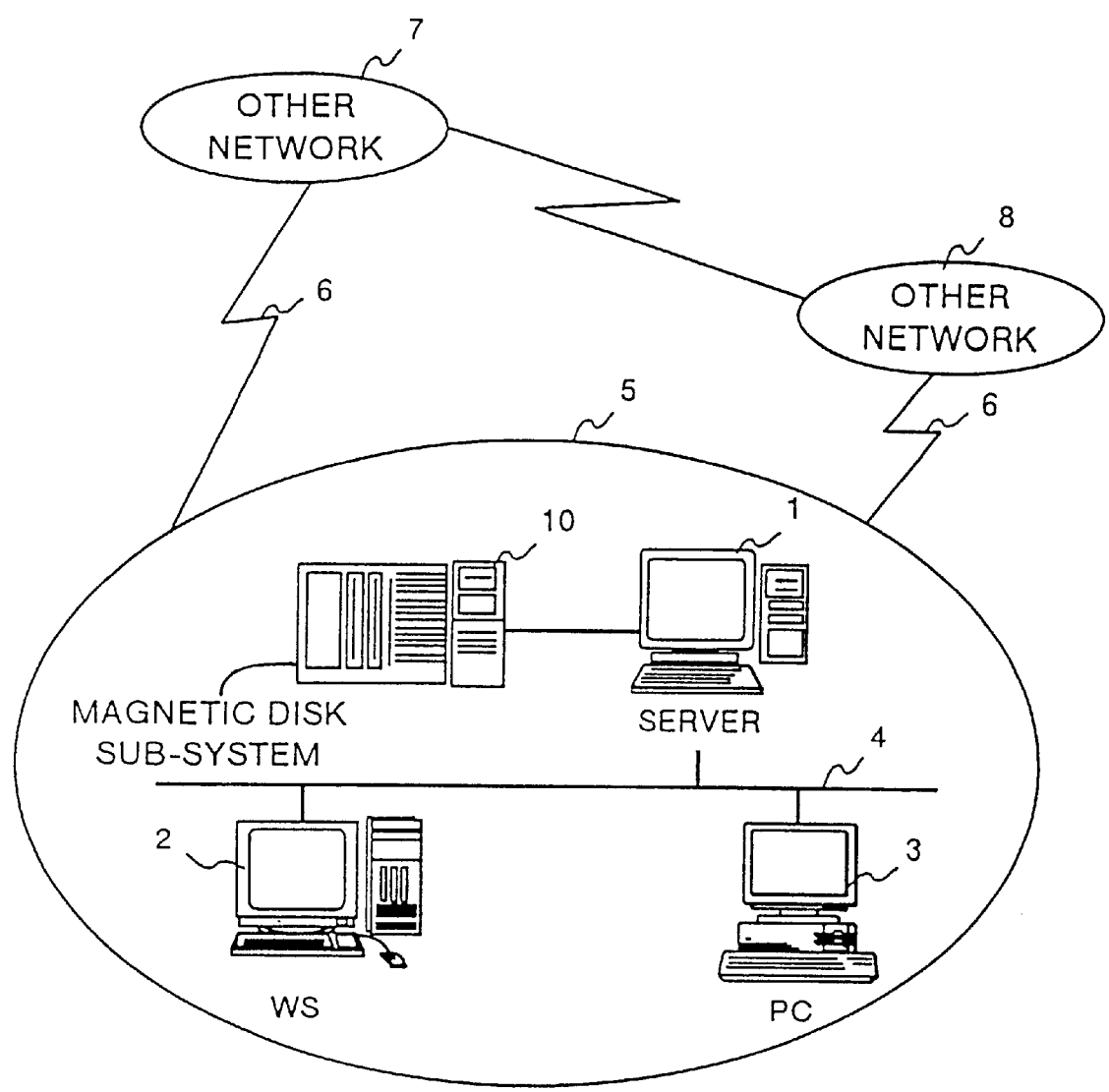
FIG. 1 is a general block diagram showing a network computing system in which the input/output control device of the present invention is utilized.

FIG. 1 is a general block diagram showing a network computing system in which the input/output control device according to the present invention is utilized. The input/output control device according to the present invention is explained in further detail below with reference to FIG. 3.

As shown in FIG. 1, a computer functioning as a server 1 (herein after referred to as a server) is coupled to a computer (such as, for instance, a work station, herein after referred to as WS) functioning as a client 2, and to a personal computer (herein after referred to as PC) also functioning as a client 3. Also coupled to the server 1 is a disk sub-system 10.

The server 1, WS 2 and PC 3 are mutually connected to each other by a LAN (Local Area Network) 4, or the like, to form a network 5. The network 5 is connected via a gateway or another network 6 (such as the Internet) to other networks 7 and 8. The number of clients in the network 5 may be 3 or more.

Figure 2:
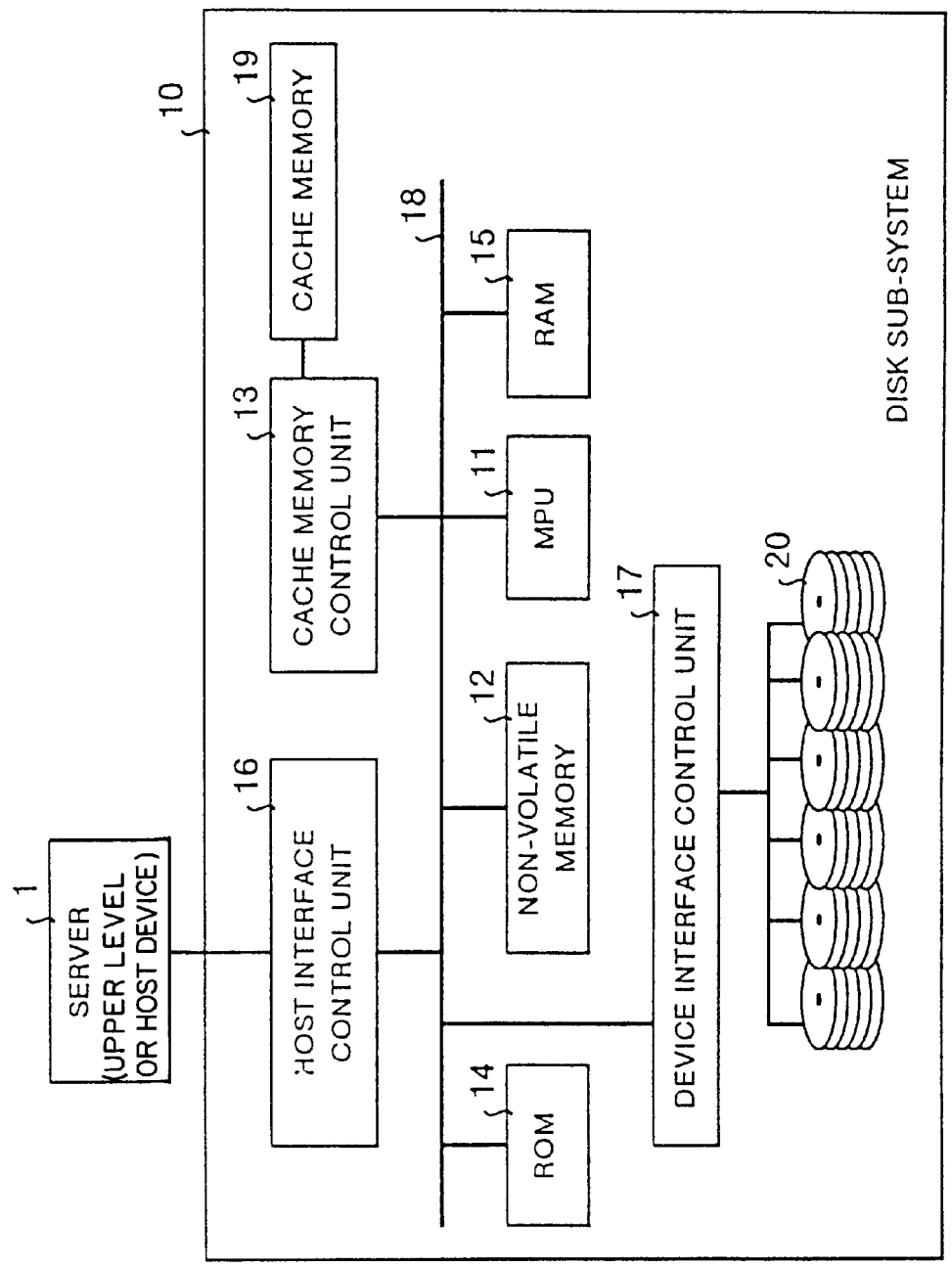
FIG. 2 is a block diagram, showing an example of a disk sub-system in which the input/output device of the present invention is utilized.

FIG. 2 is a block diagram showing an example of the disk sub-system 10. In the disk sub-system 10 shown in FIG. 2, a microprocessor (hereinafter referred to as MPU) 11, a non-volatile memory 12, a cache memory control unit 13, a read-only memory (hereinafter referred to as a ROM) 14, a random access memory (hereinafter referred to as a RAM) 15, a host interface control unit 16, and a device interface control unit 17 are connected to each other through a bus 18.

Connected to the cache memory control unit 13 is a cache memory 19. Connected to the device interface control unit 17 is a disk device 20, such as a hard disk device. The host interface control unit 16 is connected to the server 1, which is an upper level (or host) device.

The MPU controls the input/output of data (hereinafter referred to as I/O requests) to and from a disk device 20.

The non-volatile memory 12 stores therein various types of tables described hereinafter and is used for data I/O controls by the MPU 11. The non-volatile memory 12 comprises a static RAM (SRAM), which is operable with a back-up power supply source such as a battery even when power is down, or an electrically erasable/rewritable ROM (EEPROM).

The cache memory control unit 13 controls the high speed cache memory 19 storing therein data prefetched into the disk device 20 according to an I/O request from the server 1. The ROM 14 stores a control program or fixed data used in the prefetching process. The RAM 15 comprises a volatile memory such as a dynamic RAM (DRAM) or the like. The volatile memory stores the data temporarily or is used as a work area by the MPU 11.

For the reasons described above, the MPU 11, non-volatile memory 12, cache memory control unit 13, cache memory 19, ROM 14, and RAM 15 implement functions of the input/output control device according to the present invention.

Figure 3:
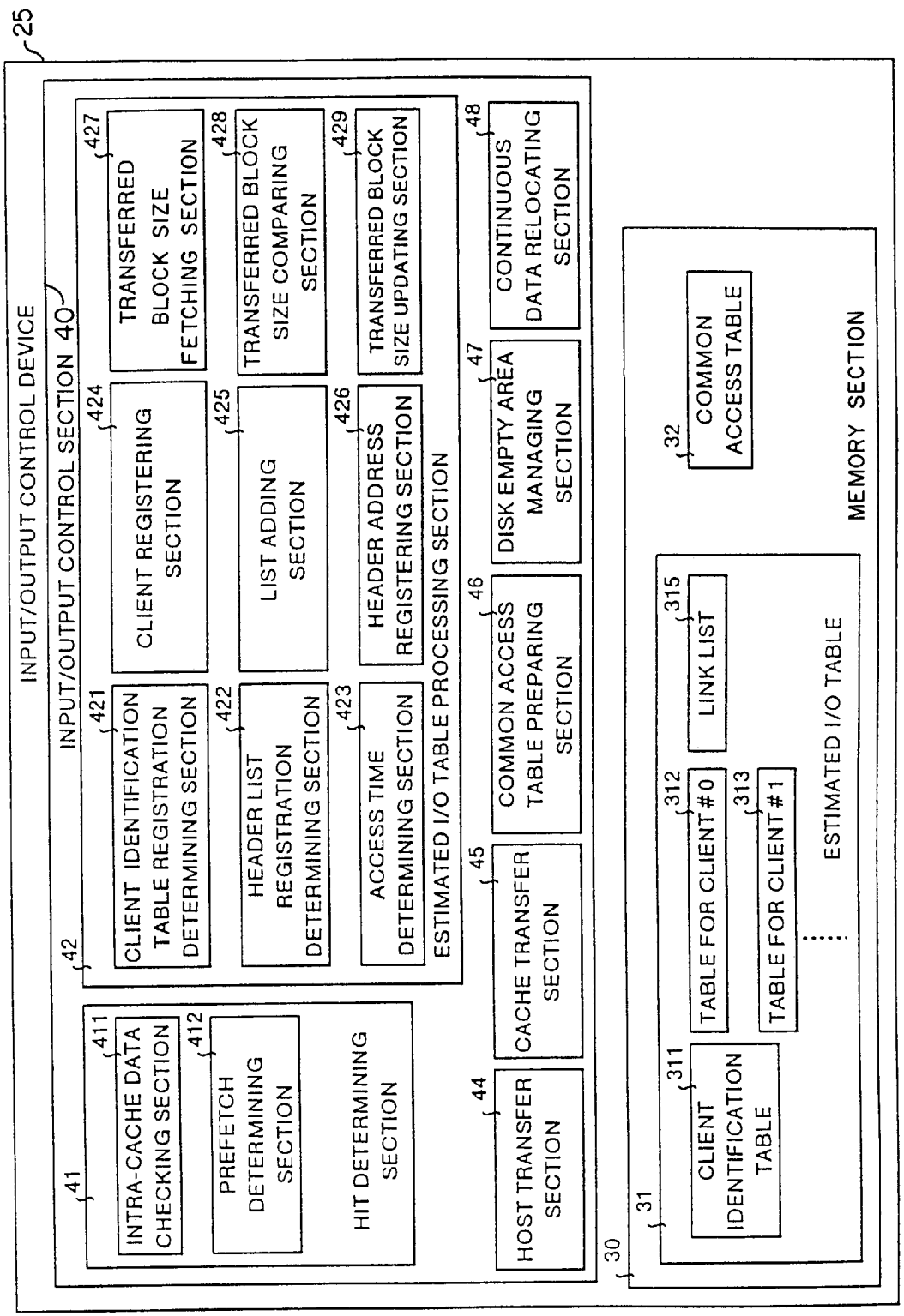
FIG. 3 is a functional block diagram showing an example of the input/output control device according to the present invention.

FIG. 3 is a functional block diagram showing an example of an input/output control device 25 of the present invention.

Referring now to FIG. 3, the inputcontrol device 25 of the present invention comprises a memory section 30 and an input/output control section 40. The memory section 30 includes an estimated I/O table 31 and a common access table 32.

The input/output control section 40 includes a hit determining section 41, an estimated I/O table processing section 42, a host transfer section 44, a cache transfer section 45, a common access table preparing section 46, a disk empty area managing section 47, and a continuous data relocating section 48.

Figure 8:
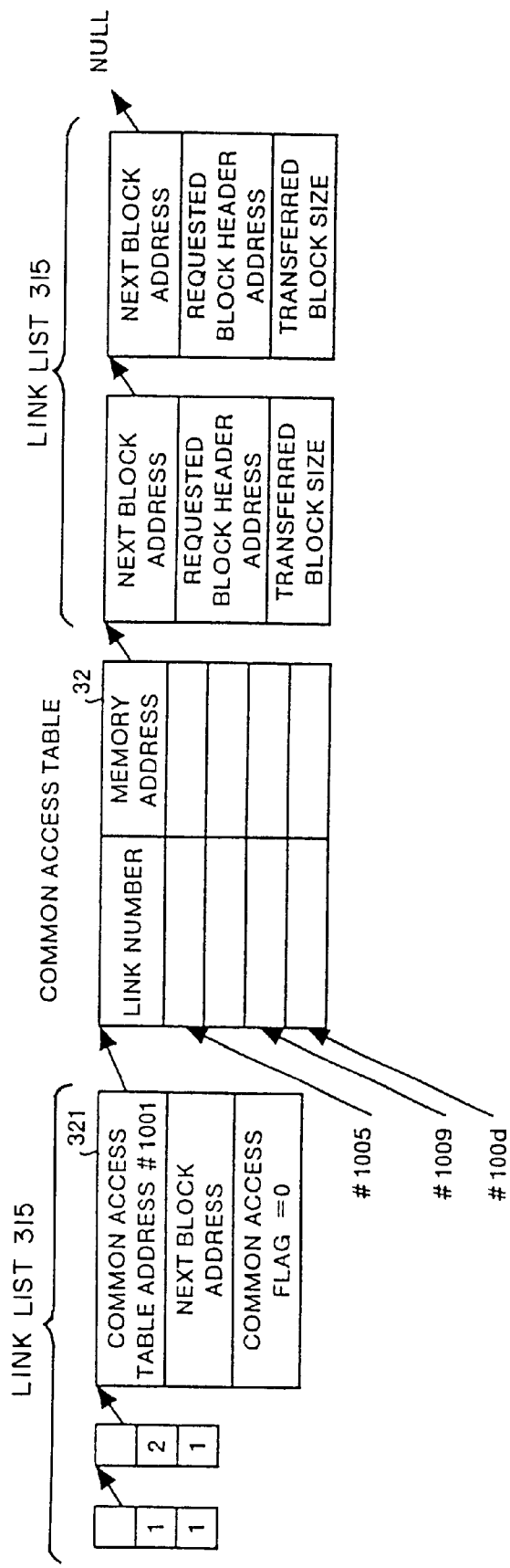
FIG. 8 is a simulated diagram showing an example of a link list in a case where a common section in a link list is stored in a common access table.
Figure 9:
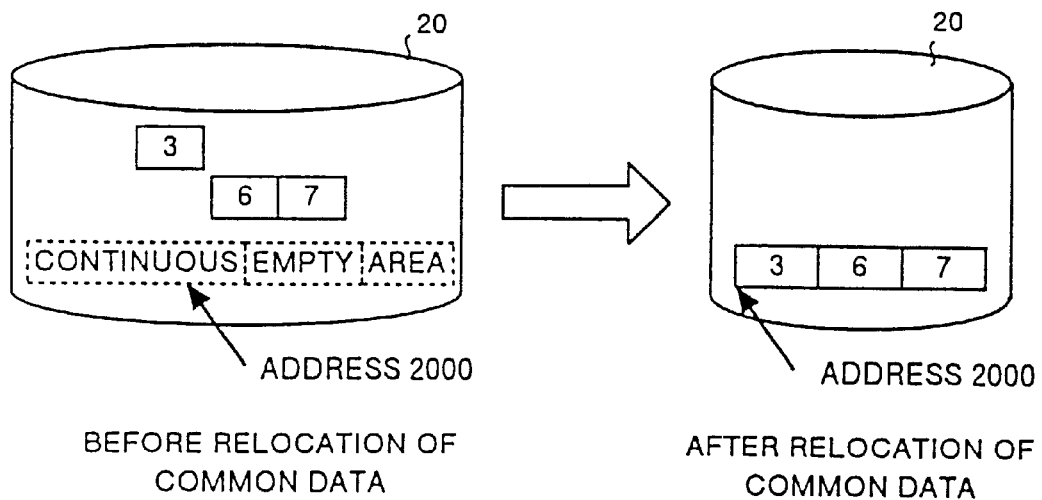
FIG. 9 is a simulated diagram showing a situation in which continuous common data is relocated in an empty area on a disk.
Figure 10:
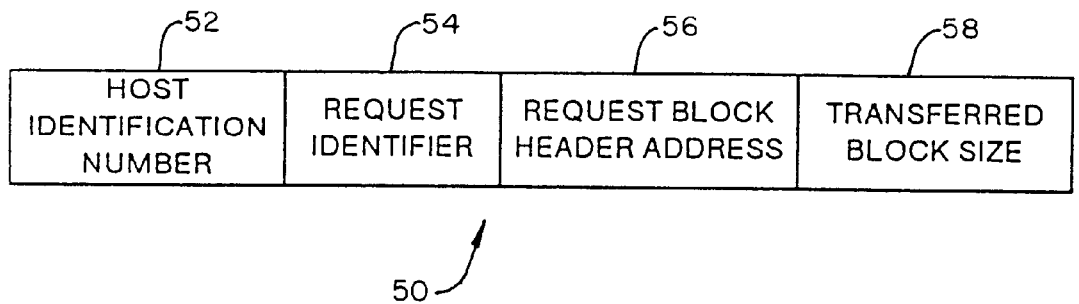
FIG. 10 is a simulated diagram showing an example of data structure in an I/O request.

The input/output control section 40 shown in FIG. 3 is explained in further detail beginning with reference to FIG. 10, after an explanation of memory section 30 with references to FIGS. 3–9.

The memory section 30 is provided in the non-volatile memory 12 shown in FIG. 2, but also may be provided in the disk device 20 shown FIG. 2. More particularly, the estimated I/O table 31 and the common access table 32 may be stored in both the non-volatile memory 12 and in the disk device 20. In this case, the estimated I/O table 31 and the common access table 32 are dually and redundantly recorded, which enhances protection against data loss or other risks.

More particularly, a system area may be provided in the disk device 20 to store the tables 31, 32. When the memory section 30 is provided in both the non-volatile memory 12 and the disk device 20, then the disk device 20 can function as a portion of the input/output control device 25 according to the present invention. Also the non-volatile memory 12 functions as a cache memory storing therein the estimated I/O table 31 and the common access table 32.

The memory section 30 is provided in the non-volatile memory 12 because the input/output of the data can be performed at a higher speed as compared to the disk drive 20 and data loss from the tables is prevented if a power failure occurs while writing the estimated I/O table 31 and common access table 32 into the disk device 20.

The estimated I/O table 31 comprises a client identification table 311, a table 312 for client #0, a table 313 for client #1, and a link list 315. Two tables for clients #0 and #1 are shown, however 3 or more tables, each corresponding to a client, may be provided.

The client identification table 311 is a table recording a correspondence between each client connected to the network 5 and an identifier (such as a number) set for each client by the input/output control section 40. The client identification table 311 is used to identify each client in the disk sub-system 10.

An example of a format of the client identification table 311 is shown in FIG. 4. As shown in FIG. 4, stored in a left column is a "client identification number (#1, #2, #3, . . . )", which is an identifier. Stored in the right column is a "table memory address" indicating a place for storage in a table for the client corresponding to each identification number. It should be noted that the address information in the "table memory address" column is omitted from the table shown in FIG. 4.

At the end of each of the "client identification number" and "table memory address", a character, such as "NULL", is stored, indicating an end of the table. When a client is newly connected to the network, an ID number of the client and address information indicating a place of storage in a table for the client newly prepared for the client are added to a column just above the "NULL". For this reason, the example shown in FIG. 4 indicates that client #8 is a newly added client.

Tables 312 and 313, each for a separate client, are tables in each of which data read requests generated from the respective client are grouped under specific conditions. The tables 312 and 313 are used to estimate an address which indicates a storage location of data corresponding to a data read request, which may be issued at a high probability, based on the data read requests generated from the client.

Examples of the tables 312 and 313, each corresponding to a client, are shown in FIG. 5A and FIG. 5B respectively. For instance, table 312 for client #0 is a table for WS1 (corresponding to the WS shown in FIG. 1), while table 313 for client #1 is a table for PC 1 (corresponding to the PC shown in FIG. 1). Stored in these tables are "ID number" for the respective client and "last access time" indicating the time at which the last data read request was issued from the client.

Stored in the table for a client, in addition, are a "requested block header address" (in the left column beginning in the third row in each table) of a data block to be read out according to a data read request from the client and a "memory address" (in the right column beginning in the third row in each table) indicating a storage location of a link list relating to the header address. The "requested block header address" in the table for WS1 is any of "1", "10" and "100", and the "requested block header address" in the table for PC1 is any of "20", "40" and "100". The address information in the "memory address" column is omitted from the tables shown in FIG. 5A and FIG. 5B.

At the end of "requested block header address" and "memory address" information, a character, for instance "NULL", is stored indicating the end of the table. When a new data read request is generated from a client and a header address of a data block specified by the data read request is added to the "requested block header address", the newly added header address and address information indicating a storage location of a link list relating to the header address are added, for instance, just above the "NULL". For this reason, in the examples shown in FIG. 5A and FIG. 5B, the address "100" is the one that is newly added.

Figure 6:
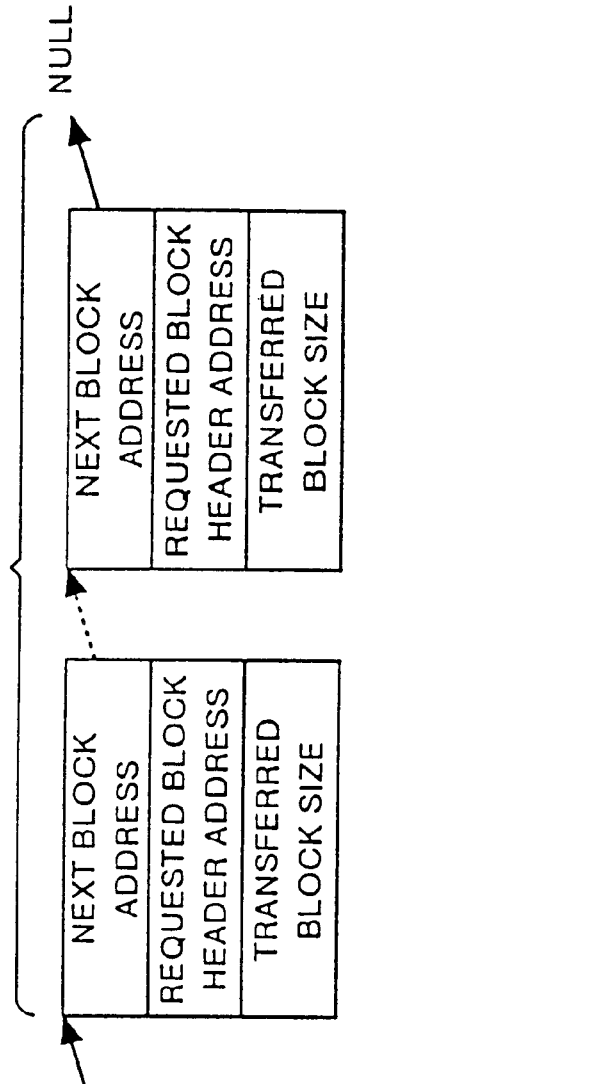
FIG. 6 is a simulated diagram showing an example of a format of a link list prepared in an embodiment of the present invention.

The link list 315 (FIG. 3) is a linked list storing, in the order of generation thereof, data blocks to be read out according to data read requests, each specifying a header address stored at the "requested block header address" (a left column in the third row in each table) of tables 312 and 313 for a client. Data blocks to be read out according to data read requests successively issued from a client in succession to the data read request above are listed in the order of generation thereof in link list 315. An example of a format of the link list 315 is shown in FIG. 6.

In the link list 315, "next block address", "requested block header address" and "transferred block size" are treated as one unit of information for each data read request issued from a client.

Conventionally, linked lists link to destinations through one or more pointers. In the present invention, a destination to which the link list 315 links is identified according to a memory address number corresponding to the header address stored in the "requested block header address" of table 312 (313) for a client. In addition, a destination corresponding to the identified address is identified according to the "next block address" in the link list 315 in the information for the identified destination. As described above, information blocks corresponding to successive data read requests are listed in series in the link list 315. The link ends when "NULL" is specified at the end of the link list 315.

A data read request issued newly from a client is regarded as a continuation of a series of data read processings when the data read request was generated within a prespecified period of time (for instance, one hour) after the last access time stored in a table for the client. For this reason, information for the "next block address", "requested block header address" and "transferred block size" is added behind the data read request just issued. More particularly, the information is added to the end of the link list 315 relating to the header address (i.e., just above the "NULL"column) and added to the list to the "requested block header address" of the table for the client.

On the other hand, when the data read request is issued after the prespecified period of time (for instance, after one hour) has passed since the last access time recorded in the table, the data read request is regarded as a header of a new series of data read processings not relating to the previous data read request. For this reason, a header address of the new data read request is newly added to just before "NULL" in the "requested block header address", and subsequently a new link list following this data read request is prepared.

Figure 7:
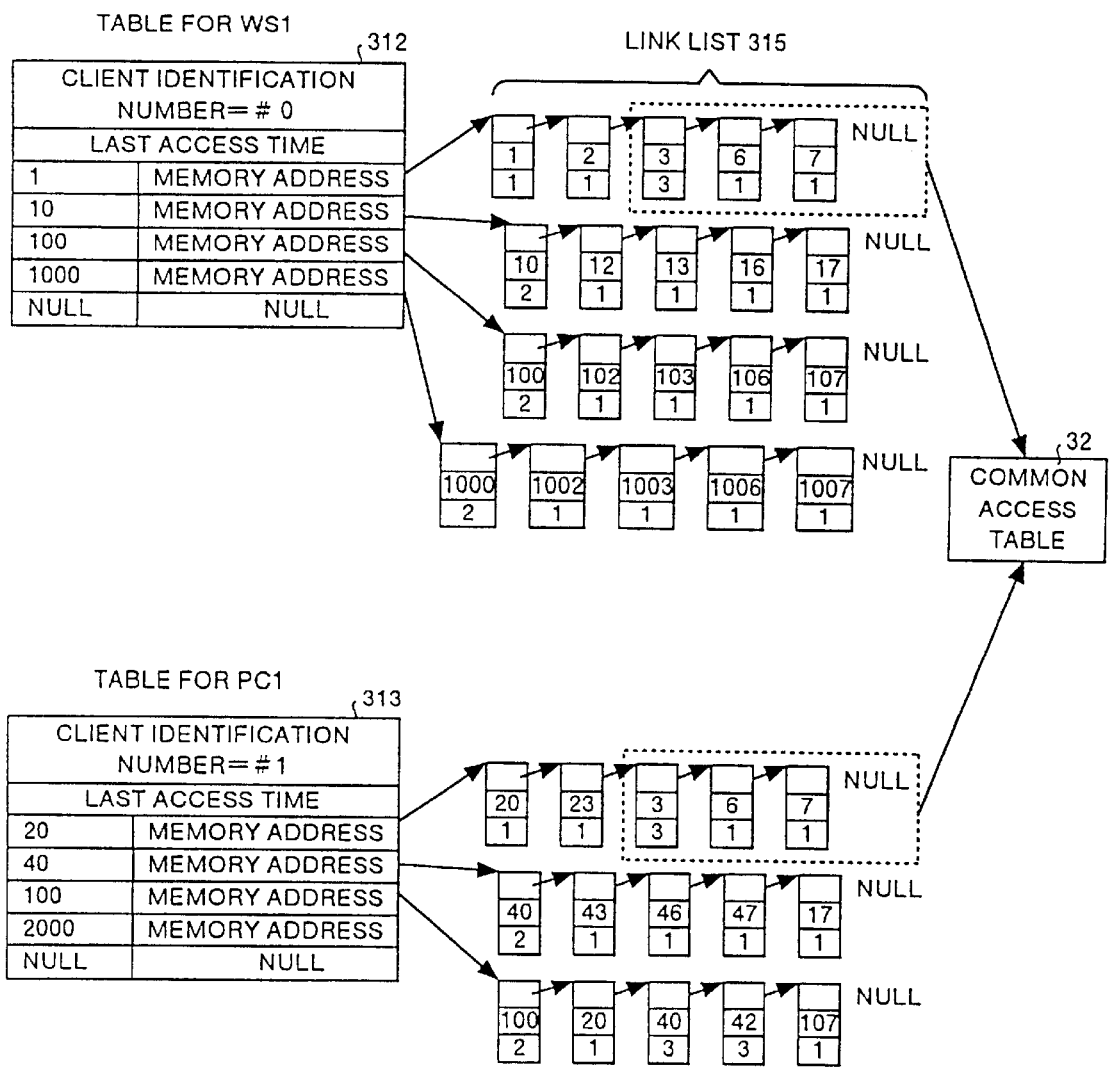
FIG. 7 is an explanatory view showing a particular example of a table for a client as well as of a link list.

The above is explained in more detail, with reference to FIG. 7. FIG. 7 shows an example, and the present invention is not limited to this example. For instance, in the third row of table 312 for WS1 as well as of the link list 315, when a data read request with the requested block header address (A) of "1" and also with the transferred block size (S) of "1" (described as data read request (A1, S1) is issued from the client WS1, the header address of "1" and a memory address indicating a storage location of a link list with ensuing data read requests listed therein are stored, respectively, in the "requested block header address" column and "memory address" column of the table 312 for WS1.

When the next data read request (A2, S1) is issued from the client WS1 within a specified period of time after generation of the data read request (A1, S1), the data read request (A2, S1) is regarded as a continuation of the previous data read request (A1, S1) and is linked to the end of the previous data read request (A1, S1).

Assume that a data read request (A3, S3) is issued from the client WS1 within a specified period of time after generation of the data read request (A2, S1), a subsequent data read request (A6, S1) is issued from the client WS1 within a specified period of time after generation of the data read request (A3, S3), and then a further subsequent data read request (A7, S1) is issued from the client WS1 within the specified period of time after generation of the data read request (A6, S1). Then the data read request (A3, S3), data read request (A6, S1), and data read request (A7, S1) are successively added to the end of the list just ahead of the "NULL". With this operation, the list in the first row in the link list 315 as shown in FIG. 7 is prepared.

A data read request (A10, S2) issued by the client WS1 after passage of the specified period of time from the generation of the data read request (A7, S1) is regarded as a request which is not related to the data read processing of the first row of the link list 315.

Thus, generation of the data read request (A10, S2) is regarded as the start of a new data read processing. For this reason, indicating a place for storage of a link list with subsequent data read requests listed therein are added newly to the "requested block header address" and "memory address" column, respectively, of the table 312 for WS1. The position where the header address of "10" and memory address are newly added is just before "NULL" in both the "request block header address" and "memory address" of the table 312 for WS1.

FIG. 7 shows that the data read requests (A12, S1), (Al3, S1, (Al6, S1) and (A17, S1) were issued in succession to the generation of the data read request (A10, S2), each within the specified period of time. This is shown in the second row of the link list 315.

After passage of the prespecified period of time since generation of the data read request (A17, S1), a next data read request (A100, S2) is issued from the client WS1, and the data read requests(A102, S1), (A103, S1), (A106, S1) and (A107, S1) are each issued within a specified period of time after generation of the respective preceding data read request. This is shown in the third row of the link list 315.

Similarly, when a specified period of time has passed after generation of the data read request (A107, S1), a next data read request (A1000, S2) is issued from the client WS1, then the data read requests (A1002, S1), (A1003, S1) and (A1007, S1) are each issued within the specified period of time after generation of the respective preceding data read request. This is shown in a list in the fourth row of the link list 315. A link list as shown in fifth, sixth and seventh rows for the client PC1 is also prepared similarly.

In the example shown in FIG. 7, in the lists in the first row and fifth row of the link list 315, the section wherein the data read request (A6, S1) and (A7, S1) in continuation with the data read request (A3, S3) (the section enclosed by a broken line) is common between the two rows. For this reason, this common section is extracted and stored in the common access table 32. Accordingly the common access table 32 is a table in which information for a common linked portion in the link list 315 is stored.

However, in the present invention, information concerning a common linked section in the link list 315 is stored in the common access table 32, and, further, data corresponding to the common linked portion is relocated in a continuous empty area on a disk (refer to FIG. 9). A storage location of relocated data is identified by the disk empty area managing section 47, and the data is written by the continuous data relocating section 48 into the identified area.

Thus, as shown in the example of the format shown in FIG. 8, a number of linkage of extracted common sections and a memory address indicating a header position of data in the relocated common sections in an empty area on the disk are stored in the common access table 32. Specifically, for instance, in the case of the first row of the link list 315 shown in FIG. 7, three data read requests (A3, S3), (A6, S1) and (A7, S1) are common, so that the number "3" (not shown) is stored in the "link number" column of the common access table 32.

In the "memory address" column of the common access table 32, a header address of data relocated on the disk (for instance, "2000" in the example shown in FIG. 9) is stored. Specific numerical values are not shown in the "link number" and "memory address" columns in the common address table 32 shown in FIG. 8.

Also shown in FIG. 8 is an example of a link list in a case in which a common section between link lists is stored in the common access table 32. When linked to the common access table 32, as shown in FIG. 8, common access table reference information 321, including a "common access table address" indicating a storage location for appropriate information in the common access table 32 and a "next block address" indicating a next link of the link list after linking to the common access table 32, is inserted into the link list 315.

The common access table reference information 321 also includes a common access flag indicating that the information has been linked to the common access table 32. The processing for inserting the information into the common access table reference information 321 is executed in a common access table preparing section 46 shown in FIG. 3. In the examples shown in FIG. 8, the common access flag being set to "0" indicates that the information is related to the common access table 32.

FIG. 9 conceptually shows a sequence of relocating continuous common data in an empty area on a disk. More particularly, FIG. 9 shows a case in which the data having been stored at the addresses "3", "6" and "7" are relocated in this order into a continuous empty area beginning from, for instance, address 2000 on disk device 20.

FIG. 10 shows an example of data structure of an I/O request 50. The "host identification number" 52 is the same as the "client identification number" in the client identification table 311. The "request identifier" 54 indicates whether the I/O request is a data read request or a data write request. The "request block header address" 56 indicates a header address of an area identified according to the I/O request 50. The "transferred block size" 58 indicates a number of data blocks to be transferred.

Reference is again made to FIG. 3 for a more detailed explanation of the input/output control section 40 of the input/output control device 25 of the present invention.

The input/output control section 40 shown in FIG. 3 includes a function controlling input/output of data realized by the MPU 11 shown in FIG. 2. The host transfer section 44 shown in FIG. 3 executes the processing which transfers to the host the data requested by the host. The cache transfer section 45 shown in FIG. 3 executes the processing which reads data of a specified number of blocks from the disk device 20 and transfers the data to the cache memory 19 shown in FIG. 2.

The common access table preparing section 46 prepares the common access table 32 by extracting common sections in the link list 315 when a specified period of time has passed from the start of this system, or each time when the specified period of time passes during use of this system. For instance, the common access table 32 is prepared at a fixed interval such as the end of every week or at the end of every month.

The disk empty area managing section 47 checks for a continuous empty area in the disk device 20. The continuous data relocating section 48 executes processing for writing data registered at an address registered in the common access table 32 in a continuous empty area in the disk device 20 in a continuous state. With this, a series of data blocks having the possibility to be read out in succession are stored in a physically continuous state on a disk as shown in FIG. 9. The relocated data may be deleted from the original storage site.

Hit determining section 41 includes an intra-cache data checking section 411 and a prefetching determining section 412 as shown in FIG. 3, and executes processing for determining whether the read data requested from a client is present in the cache memory 19 shown in FIG. 2.

The intra-cache data checking section 411 executes checking for determining, when a data read request is issued from a client, whether the corresponding data block is present in the cache memory 19 shown in FIG. 2.

When it is determined that the corresponding data block is present in the cache memory 19 of FIG. 2, the prefetching determining section 412 determines whether the data block is a prefetched one according to the estimated I/O table 31.

The estimated I/O table processing section 42 performs functions such as adding a new client to the client identification table 311 inside of the estimated I/O table 31, preparing the table 312 (313) for a client for each client, preparing a link list 315, or updating prefetched data in the cache memory 19.

As shown in FIG. 3, the estimated I/O table processing section 42 includes a client identification table registration determining section 421, a header list registration determining section 422, an access time determining section 423, a client registering section 424, a list adding section 425, a header address registering section 426, a transferred block size fetching section 427, a transferred block size comparing section 428, and a transferred block size updating section 429.

The client identification table registration determining section 421 determines, when a requested data block is not present in the cache memory 19 or when the requested data block is present in the cache memory 19 but the data block is not a block prefetched according to the estimated I/O table 31, whether the client has been registered in the client identification table 311.

The client registering section 424 registers, when the client that has made a request has not been registered in the client identification table 311, the requesting client in the client identification table 311 and prepares the table 312 (313) for the client.

Then a memory address indicating a storage location in the table 312 (313) for the client is registered in the client identification table 311. In addition, a header address for the data block requested to be read out and a memory address indicating a storage location of the link list 315 are registered in the table 312 (313) for the client.

The header list registration determining section 422 determines, when the requesting client has been registered in the client identification table 311, whether a header address of the data block requested to be read out has been registered in the "requested block header address" in the table 312 (313) for the client.

The access time determining section 423 determines, when a header address of the data block requested to be read out has not been registered in the "requested block header address" column in the table 312 (313) for the client, whether a specified period of time has passed after generation of the previous data read request was made from the same client.

The header address registering section 426 registers, when the data read request was generated after passage of a specified period of time since generation of the previous data read request from the same client, the data block header address for the data read request in the "requested block header address" in the table 312 (313) for the client. Also a memory address indicating a storage location of the link list 315 is registered in the table 312 (313) for the client.

The list adding section 425 adds information comprising a block header address for the data read request and a transfer block size to the end of the link list 315 for the client when the data read request is issued within a specified period of time after generation of the previous data request.

The transferred block size fetching section 427 checks, when a header address of the data block requested to be read out has been registered in the "requested block header address" in the table 312 (313) for a client, a transferred block size of the link list 315 according to the registered requested block header address.

The transferred block size comparing section 428 compares the checked transferred block size to a size of a transferred block requested to be read out. As a result of the comparison of a transferred block size, if the size of the transferred block currently being requested to be read out is larger than the checked transfer block size, the transferred block size updating section 429 updates the transferred block size previously registered to the size of transferred block currently requested to be read out.

Functions executed by the input/output control device 25 of the present invention having the configuration as described above are explained with reference to FIG. 11 through FIG. 13.

Figure 11:
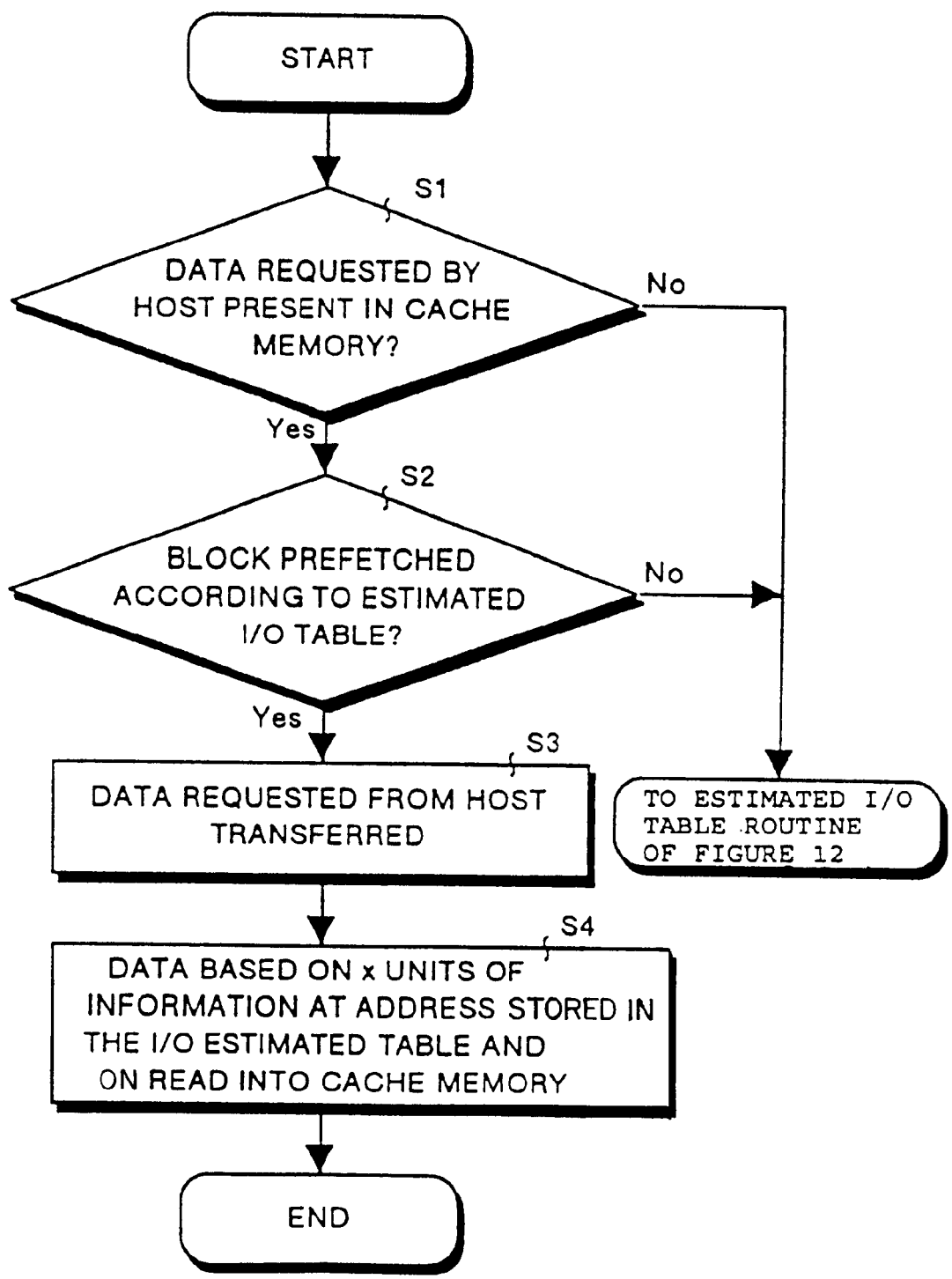
FIG. 11 is a flow chart showing an example of high determinate processing for data in a cache memory according to the input/output control method according to the present invention.

Referring now to FIG. 11, initially after a data read request is issued from a client, determination is made as to whether the requested data block is present in the cache memory 19 of FIG. 2 (step S1).

When it is determined in step S1 that the requested data block is present in the cache memory 19 shown in FIG. 2, determination is made whether the data block is a block prefetched according to the estimated I/O table 31 (step S2).

When it is determined in step S2 that the requested data block in the cache memory 19 is a block prefetched according to the estimated I/O table 31, the requested data is transferred in step S3 from the cache memory 19 to the host (server 1 shown in FIG. 2).

Then, a specified number (x units) of data blocks or information at the beginning address stored in the estimated I/O table 31 is read from the disk device 20 and transferred to the cache memory 19 (step S4). For a data block prefetched and stored in the cache memory 19, information indicating that the data block is prefetched and information for a next block address at an address to be read out successively are added.

Assume that information including a "next block address", a "requested block header address" and "transferred block size" to be one unit, and a quantity of prefetched data is x units of information in the link list 315. A number of prefetched data blocks for each information unit corresponds to a section including a "requested block header address" of the information unit and equal to the "transferred block size" from the address number. Herein x is a variable value, and is set by the system manager.

Figure 12:
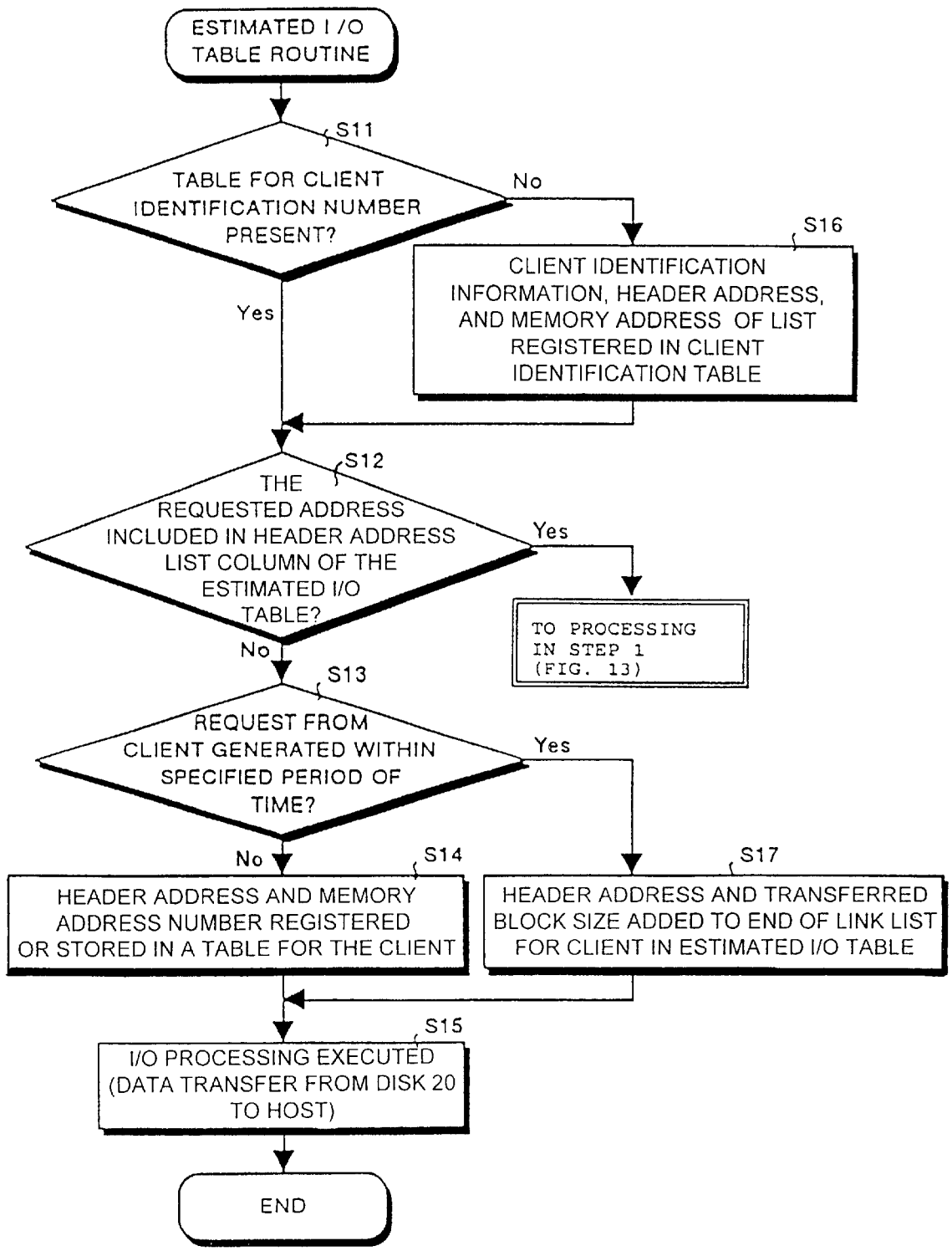
FIG. 12 is a flow chart showing an example of the processing for an estimated I/O table in the input/output control method according to the present invention.
Figure 13:
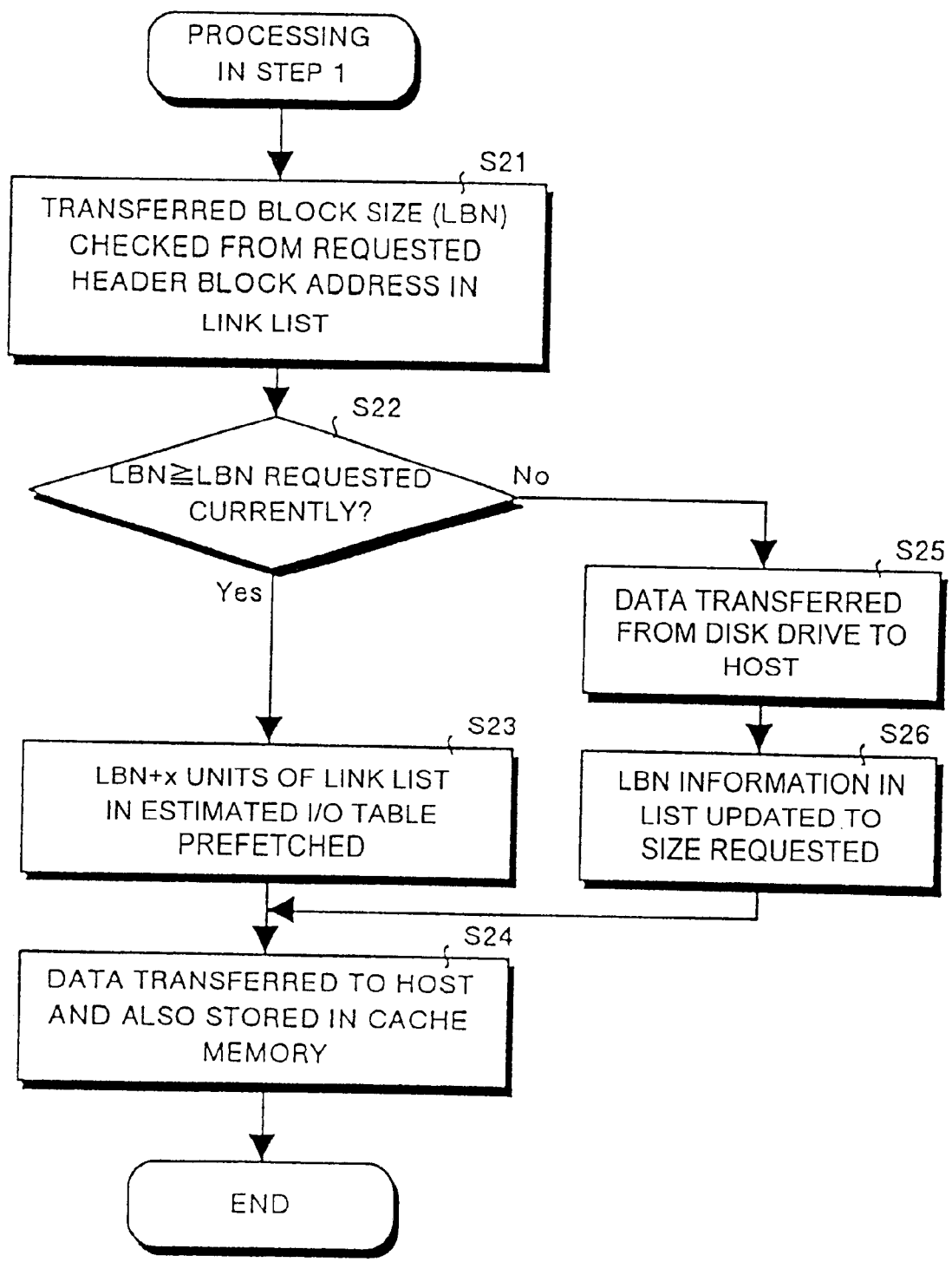
FIG. 13 is a continuation of a flow chart of FIG. 12 showing an example of the processing for the estimated I/O table in the input/output control method according to the present invention.

When it is determined in step S1 that the data block requested to be read out is not present in the cache memory 19, or when it is determined in step S2 that the requested data block in the cache memory 19 is not the one prefetched according to the estimated I/O table 31, then the estimated I/O table routine of FIG. 12 is invoked, and determination is made whether a table for that client ID number is present, i.e., whether the client that has issued the data read request has been registered in the client identification table 311 (refer to step S11 of FIG. 12).

When it is determined in step S11 of FIG. 12 that the requesting client has been registered in the client identification table 311, determination is made whether a header address of the data block requested to be read out has been registered or included in the "requested block header address" column in the table 312 for the client (step S12).

On the other hand, if it is determined that the requesting client has not been registered in the client identification table 311, the requesting client is registered in the client identification table 311. Also the table 312 (313) for the client is prepared. In addition, a memory address indicating the storage location in the table 312 (313) for the client is registered in the client identification table 311.

The header address of the data block to be read out and a memory address indicating a storage location of the link list 315 are registered in the table 312 (313) for the client (step S16). Then control shifts to step S12.

If it is determined in step S12 that a header address of the data block requested to be read out has not been registered in the "requested block header address" of the table 312 (313) for the client, determination is made whether the data read request was issued within a specified period of time after generation of the previous data read request from the same client (step S13). Herein the specified period of time is variable and is set by the system manager.

When it is determined that the data read request was issued after passage of a specified period of time since generation of the previous data read request from the same client ("no" in step S13), a header address of the data block requested to be read out and a memory address number indicating a storage location linking thereto are stored in the table 312 (313) for the client (step S14).

Then system control shifts to step S15, and I/O processing is executed. More particularly, the requested data is transferred from the disk device 20 of FIG. 2 to the host (server 1). Data in a specified number of blocks beginning at the header address of the requested data is read out from the disk device 20 and is transferred to the cache memory 19. In Step S15 of FIG. 12, a quantity of data stored in the cache memory 19 is the same as that explained in step S4 of FIG. 11.

When it is determined in step S13 that the data read request was issued within a specified period of time after generation of the previous data read request from the same client ("yes" in step S13), information comprising a header address of the block requested to be read out and a transferred block size is added to the end of the link list 315 for the client (step S17). Then system control shifts to step S15, and I/O processing is executed.

If it is determined in step S12 that a header address of the data block requested to be read out has been registered in the "requested block header address" of the table 312 (313) for the client, a check is made for a transferred block size (LBN: Logical Block Number) of a list positioned at a header of the link list 315 according to the registered requested block header address (refer to step S21 of FIG. 13, part of the "processing in step 1" flowchart, entered through the "to processing in step 1 (FIG. 13)" option in FIG. 12).

Then the checked transferred block size is compared to a size of a transferred block currently being requested to be read out, and determination is made as to which of the transferred block sizes is larger (step S22).

When it is determined in step S22 that the transferred block size LBN for the requested block header address registered in the table 312 (313) for the client is larger than or equal to the transferred block size currently being requested to be read out ("yes" in step S22), a quantity of data with x units of information, each unit including a "next block address", "requested block header address", and "transferred block size" added to the transferred block size stored in the estimated I/O table 31, is prefetched from the disk device 20 (step S23).

Then the requested data is transferred from the cache memory 19 to the host, and the prefetched data is also transferred to and stored in the cache memory 19 (step S24). With this operation, the processing comes to an end.

On the other hand, if it is determined in step S22 that the transferred block size LBN for the request block header address registered in the table 312 (313) for the client is smaller than a size of a transferred block currently being requested to be read out, the requested data is read out from the disk drive 20 and transferred to the host (step S25).

Then, information concerning the transferred block size registered in the link list 315 before generation of the data read request is updated to the size of the transferred block size being requested to be read out (step S26). Subsequently, system control returns to step S24, and data including a new transferred block size is stored in the cache memory 19, and the processing comes to an end.

An example of management of an empty area in a disk by the disk empty area managing section 47 is now described. In an ordinary system, information for storage in an empty area is also often stored in a memory of a host machine such as a server. However, in practice, the information stored in the memory of the host machine does not generally coincide with the information stored in a magnetic disk. For this reason, in this example, to make the information for storage in an empty area in a magnetic disk coincident with that in the host, a maintenance mode is provided. This maintenance mode is effected, for instance, when servicing the system, or when preparing the common access table 32.

For instance, when it is time for system maintenance, a file management table in the host machine is written back to the disk to ensure that the information in the disk coincides with the information in a memory of the host machine. The same algorithm as that used in the file system management method in the host machine is used as an empty area retrieval processing routine.

File management in a disk sub-system is realized by using in a disk sub-system the same empty area retrieval processing routine as that used in the host machine. In the disk sub-system, continuous area write processing is carried out by referring to the common access table. The empty area retrieval method is effected only when a continuous area can be acquired in a section with a larger logical block number. If such an area can not be acquired, the processing is not carried out. The acquired number of blocks of the disk is recorded in the common access table. The old common access table, having been filled to capacity at some point in time, is maintained without being deleted and reference is made to the old common access table when read requests are issued from the host machine non-successively.

Figure 14:
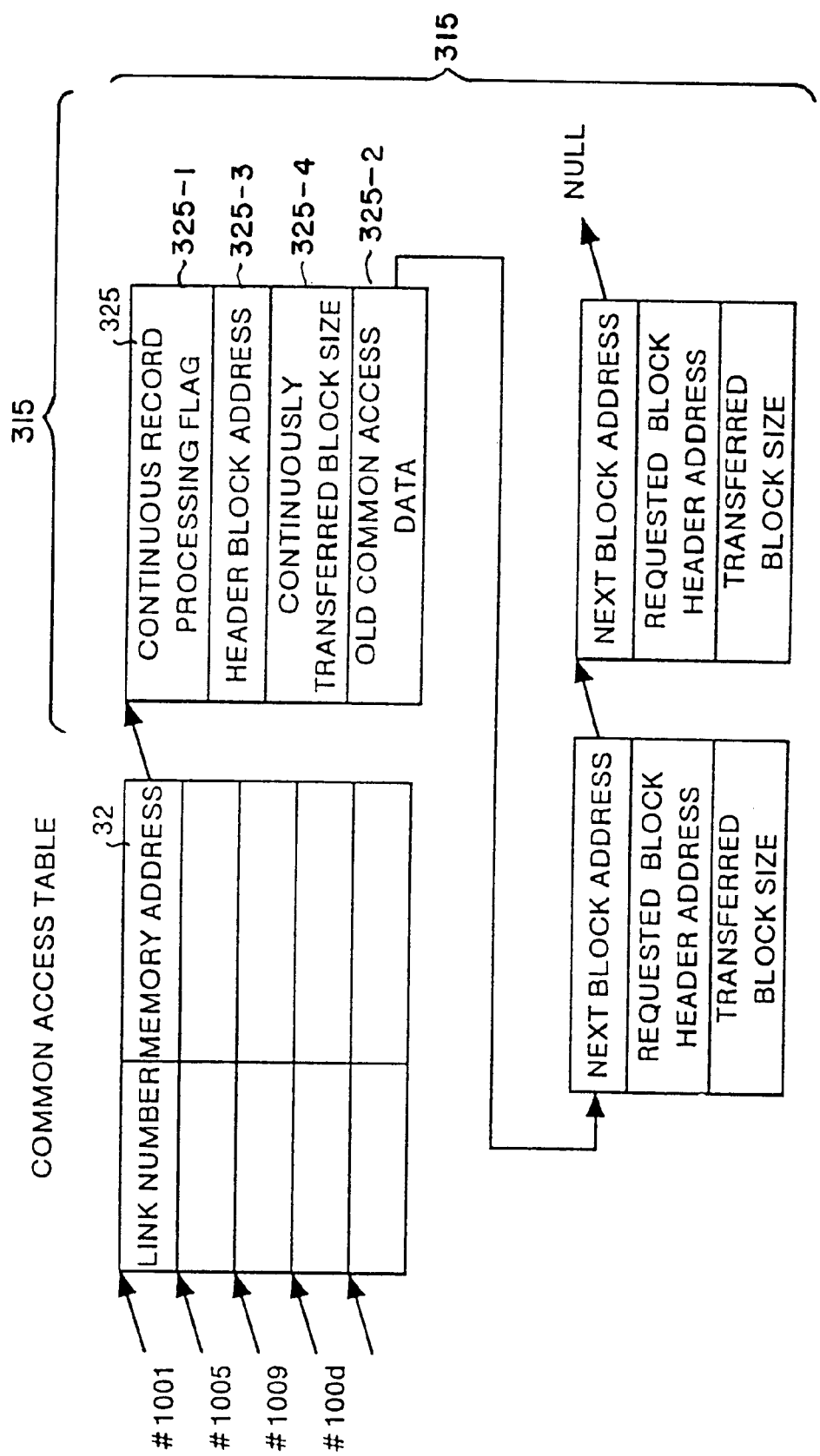
FIG. 14 is a simulated diagram showing an example of a link list in a case where information in a common access table is recorded in a successive block area in a disk.

More particularly, FIG. 14 shows an example of a link list 315 in a case in which information for a common access table 32 is recorded in a continuous block area in a disk.

In the case shown in FIG. 14, continuous record processing reference information 325 is inserted into the link list 315. The continuous record processing reference information 325 includes a.continuous record processing flag 325-1 indicating whether the information has been subjected to continuous record processing and also indicating a presence of old access table data and old common access data 325-2. A header block address 325-3 and a continuously transferred block size 325-4 are also included in the continuous record processing reference information 325.

The processing for inserting the continuous record processing reference information 325 is executed, for instance, by the common access table preparing section 46 after a continuous block area. Specific numerical values for the "link number" and "memory address number" columns are not shown in the common access table 32 shown in FIG. 14.

However, when a data write request is issued to a disk area independently used by a disk sub-system (an area of a disk in which data was recorded in a continuous empty area by referring to a common access table 32), processing is executed to prevent the area used as a common continuous area from being used by the disk sub-system. With this operation, an address of the common access table 32 is returned to the old one (that is, the restored state), as explained.

In the example shown in FIG. 14, information in a common access table is recorded in a successive block area in a disk. Further, FIG. 14 shows an access table for an access block requested from a plurality of clients and the common access table.

In the example shown in FIG. 14, the original access tables are owned by each client. When a pattern of accessing the same area with substantially the same pattern appears, the pattern according to the present invention is used to improve the performance by sequentially accessing the continuous area and writing data therein without accessing various areas distributed in a disk. The pattern according to the present invention is defined herein as continuously writing data in an empty area of a subsystem if a certain pattern can be established.

This common access table is independent of a host device, and if a write instruction is written in the area in which data was continuously written as described above, the common access table must be aborted, and the state before preparation of the common access table must be restored. The "old one" discussed herein above indicates the restored state.

With the embodiment of the present invention described herein above, the link list 315, with data read requests from a client recorded therein in the order of generation thereof, is provided for each client. Data is prefetched according to this link list 315, so that the addresses and data stored at non-successive addresses (as an object to be prefetched) are estimated and data is prefetched regardless of the succession of addresses.

Furthermore, with the embodiment of the present invention described above, a data read request generated within a specified period of time after generation of the previous data read request from the same client is added to the end of the link list 315, and a data read request generated after passage of the specified period of time is added to a header of a new link list 315, so that data is prefetched for each appropriate number of blocks.

With the embodiment of the present invention described herein above, common sections between a plurality of link lists 315 are stored in the common access table 32, and the common access table reference information 321 is inserted into places corresponding to common sections in the original link lists 315 instead of simply listing the common sections therein. With the present invention, the common sections are not stored redundantly and the amount of storage required for storing the link lists 315 is reduced compared to that required by the original link lists.

Also with the embodiment of the present invention described above, since the link list 315 or the common access table 32 is stored in the disk device 20, even if power to the server 1 is turned OFF, the data for the link list 315 or common access table 32 is maintained.

Also with the embodiment of the present invention described herein above, the link list 315 or common access table 32 is stored in the non-volatile memory 12, so that data is read out at a higher speed as compared to when the data is stored on the disk device 20. Also when writing the link list 315 or common access table 32 into the non-volatile memory 12, data in the link list 315 or common access table 32 is prevented from being lost due to power failure or for other reasons.

Also with the embodiment of the present invention described above, data corresponding to common sections between the link lists 315 is relocated and written in a continuous empty area of the disk device 20, so that a series of data corresponding to the common sections is read from the disk device 20 at a higher speed as compared to the series of data before relocation of the data, in which the data corresponding to the common sections is stored in a discontinuous state in a memory area of the disk device 20.

Further with the embodiment of the present invention described above, when data read requests are received in succession from a plurality of unspecified clients connected to the network 5 (refer to FIG. 1), addresses storing data read out in succession are estimated in an input/output device, and the data is stored in the cache memory 19 regardless of the succession of the address numbers, so that read processing is executed at a high speed.

Although the present invention is applied to the disk sub-system 10 of the server 1 in a network computing system shown in FIG. 1, the configuration of the present invention is not limited to that shown in FIG. 1. More particularly, the present invention can be applied to a system in which various types of peripheral devices are connected to a single computer based on SCSI (Small Computer System Interface) standards or to a system in which various types of peripheral devices are connected to a single computer via a FC (Fiber Channel) interface. In this case, the computer and each of the peripheral devices function as a server and a client respectively. The computer and devices are connected to each other with a dedicated cable. Also in the system using the SCSI standards, the client identification number may be an identification number used in the SCSI standards.

Although the input/output control device is provided in the disk sub-system 10 in the embodiment of the present invention described above, the configuration is not limited to this, and the input/output control device may be provided in the server 1 or may be provided as a device independent from a server or from a disk sub-system.

Although the disk device 20 is referred to as a hard disk, the disk device 20 could be a direct access storage device (DASD) such as an optical disk device or a photo-magnetic disk device.

Furthermore, as explained with reference to FIG. 9, the data in blocks (elements 3, 6 and 7) are written in a continuous empty area of the same disk device, but the data could be relocated and written in a continuous state in a different disk drive. In this case, a mapping table indicating in which disk each block of data is stored after relocation is provided in the input/output control device.

In the above description it is assumed that data relocated continuously in an empty area of a disk is deleted afterwards, but the relocated data may be left as it is in its original place. In this case, if write processing is executed to the relocated data block, it is necessary to execute write processing to data in the original data block as well.

With the configuration as described above, for instance, in the example shown in FIG. 9, when data in three blocks 3, 4 and 5 (blocks 4 and 5 are not shown in FIG. 9) or in three blocks 5, 6 and 7 (block 5 is not shown in FIG. 9) are successively prefetched, the three blocks 3, 4 and 5 or three blocks 5, 6 and 7 are continuously relocated, so that the data can be read out at a higher speed from the original places.

Figure 15:
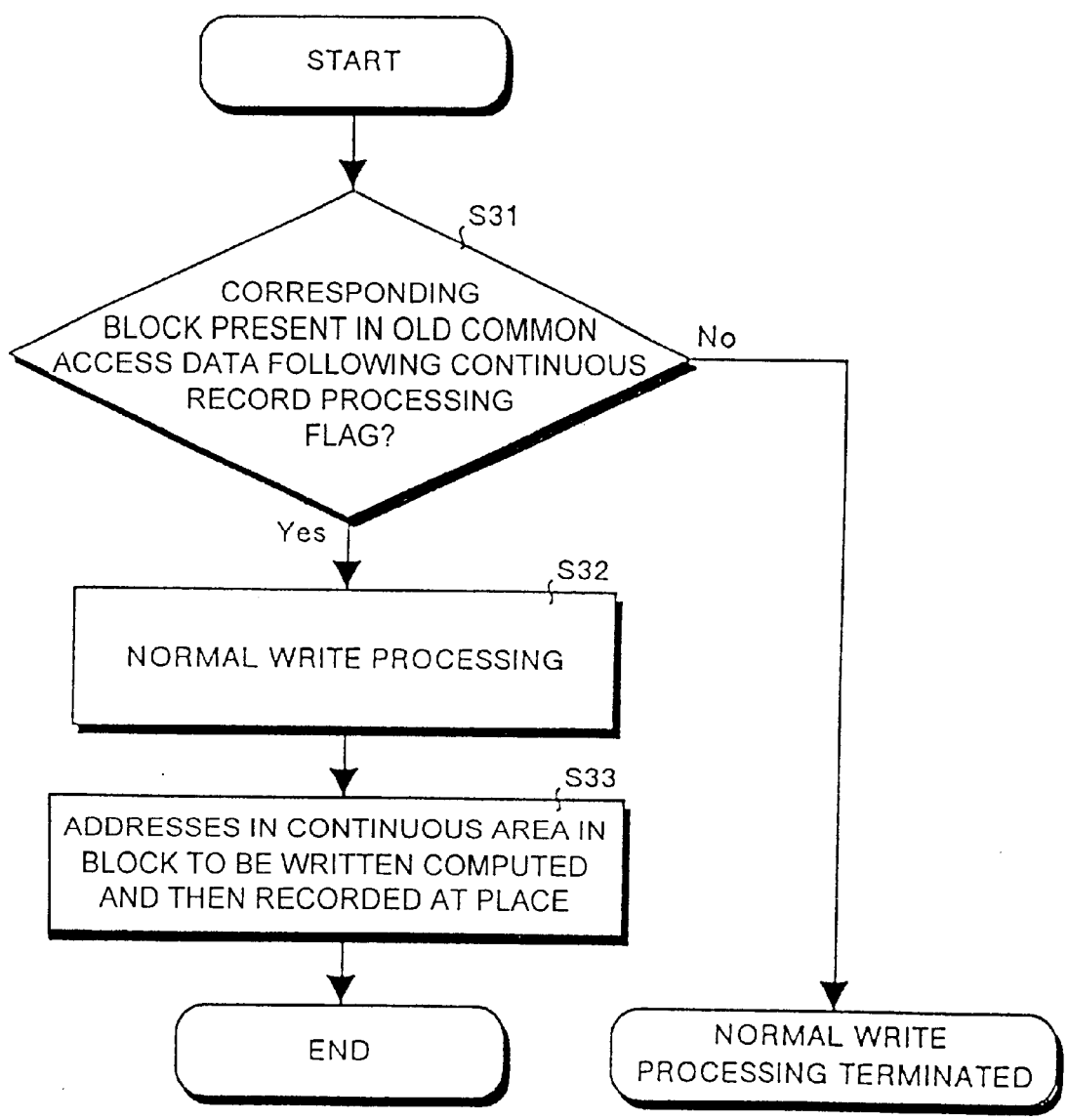
FIG. 15 is a flow chart showing an example of the processing executed when data is written in a disk in the input/output control method according to the present invention.

FIG. 15 shows an example of processing when data is written into a disk in the present invention. When a data write request is issued, determination is made whether a requested block is present in the old common access data (refer to FIG. 14) following reference to the continuous record processing flag in the common access table 32 (step S31). When it is determined that the requested block is not present, the normal write processing is terminated. On the other hand, when it is determined that the requested block is present, normal write processing is executed (step S32). After execution of the normal write processing, addresses in a continuous area in the block to be written are computed to record the location or place (step S33), and then the write processing is terminated.

The present invention and advantages thereof are described above, but various changes, replacement, and modifications are possible within the spirit and scope of the invention defined in the attached claims.

As described above, with the invention, a list, with data read requests from a slave device recorded therein in the order of generation thereof, is provided for each slave device, and data is prefetched according to this list, so that the addresses and data stored at not-successive addresses (which data is an object of prefetching) is estimated and data is prefetched regardless of the succession of addresses.

With the present invention, a data read request generated within a prespecified period of time after generation of the previous data read request from the same slave device is added to an end of a list, while a data read request generated after passage of the prespecified period of time since generation of the previous data read request from the same slave device is added to a header of a new list, so that data is prefetched by an appropriate number of blocks.

With the present invention, common sections between or among a plurality of lists are stored in a common table, and information referring to the common table is inserted in places in the original lists in which the common sections are present, instead of simply listing the common sections. Accordingly, it is not necessary to store the common sections redundantly and the capacity required for storage of lists is reduced as compared to that of the original lists.

With the present invention, because data corresponding to the common sections between or among a plurality of lists is relocated and written in a continuous state in an empty area of a storage device, a series of data corresponding to the common sections is read out from a storage device at a higher speed as compared to when the data is stored in a discontinuous state.

In addition to the description of the present invention disclosed herein above, the following items are further disclosed herein:

(1) An input/output control device in which a non-volatile memory is connected to a list adding section as well as to a header registering section, and a list or a common table is stored in the non-volatile memory. With this input/output control device, a list or a common table is stored in a non-volatile memory, so that input/output of data is executed at a high speed as compared with storing them in a disk. Also a loss of the data stored in a list or a table due to power failure or for other reasons is prevented when a list or a common table is written in a non-volatile storage device.

(2) The continuous data relocating section maintains data to be relocated without deleting the data, and the cache transfer section reads out the continuous data from the original places. With this feature, even after data is relocated, it is possible to read out the data when prefetching data which is continuous before relocation, or when actually transferring the data to an electronic computer.

(3) The mainframe electronic computer is a computer functioning as a server, while a slave device is a computer functioning as a client and provides controls over input/output of application program data and user data to and from the storage device in a network computing system with the application programs and user data stored in the storage device. With this configuration, when data read requests are received in succession from a plurality of clients connected to a network, addresses of data to be read out successively are estimated within the input/output control device, and the data is stored in a cache memory regardless of the succession of the address numbers, so that read processing is executed at a high speed.

(4) The mainframe electronic computer is a computer, and a slave device is a peripheral device connected via a SCSI interface or an FC interface to the computer. With this feature, even in a system with peripheral devices connected to a computer via the SCSI interface or the FC interface, addresses of data to be read out successively are estimated previously in the input/output control device, and the data is stored in a cache memory regardless of the succession of address numbers, so that read processing is executed at a high speed.

(5) The storage device is a hard disk device. With this configuration, data is read out at a high speed from a hard disk connected to the mainframe electronic computer.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An input/output control device controlling transactions of data between a mainframe electronic computer with slave devices and a storage device, storing therein data, connected thereto, said input/output control device comprising:

a cache memory storing data stored in the storage device;

a memory section comprising an initial list including data read requests from each of the slave devices recorded therein according to an order of generation of the requests; and an input/output control section comprising:

an access time determining section determining, when it receives a data read request from one of the slave devices, whether a specified period of time has passed since generation of a previous data read request from the same one of the slave devices;

a list adding section adding, to the end of said initial list, a data read request generated within a specified period of time after generation of a previous data read request made from the same one of the slave devices for said same one of said slave devices;

a header registering section registering at a header of a new list a data read request generated after a specified period of time has passed from generation of a previous data read request from the same one of the slave devices; and a cache transfer section transferring data from said storage device to said cache memory, wherein said input/output control device stores the data in said cache memory by prefetching the data according to one of said initial list and said new list.

2. An input/output control device according to claim 1 further comprising:

a common access table recording common sections between at least two different lists, each of said at least two different lists corresponding, respectively, to and including data read requests from one of the slave devices recorded therein according to an order of generation of the requests; and a common access table preparing section preparing a common access table based on said common sections at a specified time interval and inserting, into said at least two different lists, information referring to said common access table in place of the common sections in said at least two different lists.

3. An input/output control device according to claim 2, wherein said at least two different lists and said common access table are stored in said storage device.

4. An input/output control device according to claim 2, further comprising:

an empty area managing section checking for a continuous empty storage area in said storage device; and a continuous data relocating section writing the data stored in said at least two different lists relating to the common sections in a continuous empty area of said storage device in a continuous state.

5. An input/output control device according to claim 2, further comprising:

a second storage device connected to said mainframe electronic computer;

an empty area managing section checking for a continuous empty storage area in said second storage device; and a continuous data relocating section writing the data stored in said at least two different lists relating to the common sections in a continuous empty area of said second storage device in a continuous state.

6. An input/output control method in a system in which a plurality of slave devices and a storage device are connected to a mainframe electronic computer for executing data transactions between said storage device and said mainframe electronic computer, said method comprising:

determining, when a data read request is generated from one of said slave devices, whether a specified period of time has passed since generation of a previous data read request from the same slave device;

adding to the end of an initial list data read requests generated within a specified period of time after generation of a previous data read request from the same slave device, the initial list including data read requests from the slave device recorded in the order of generation of the data read requests;

registering at a header of a new list data read requests, each generated after passage of a specified period of time since generation of a previous data read request from the same slave device, the new list recording therein data read requests from the same slave device in the order of generation of the data read requests; and transferring data to a cache memory coupled to the storage device through a device interface control unit and a cache memory control unit by prefetching the data from said storage device based on one of the initial list and the new list.

7. An input/output control method according to claim 6, further comprising:

preparing a common access table recording a common section between at least two different lists at a specified time interval and inserting into the at least two different lists information referring to said common access table in place of the common section between the at least two different lists.

8. An input/output control method according to claim 7, further comprising:

checking for a continuous empty storage area in said storage device and writing the data stored in said lists relating to the common section in the continuous empty storage area in said storage device in a continuous state.

9. An apparatus comprising:

computers initiating data read requests; and an input/output control device, in communication with the computers, storing a list including data read requests from the computers recorded therein according to an order of generation of the requests and determining whether to add a next data read request from one of the computers to a list corresponding to the one of the computers or to begin a new list, based upon whether the next data read request was made before a specified time had passed since the generation of a previous read request from the same computer, said input/output control device prefetching data according to one of the lists.

10. The apparatus according to claim 9, wherein the initial list is a link list and the new list is a link list.

11. An input/output control device coupled to a server and to a disk sub-system, said server coupled to clients, said input/output control device comprising:

a memory section storing an initial list including data read requests from the clients recorded therein according to an order of generation of the requests; and an input/output control section determining whether to add a next data read request from one of the clients to the initial list corresponding to the one of the clients or to begin a new list, based upon whether the next data read request was made before a specified time had passed since the generation of a previous read request from the same client, said input/output control device prefetching data according to one of the initial list and the new list.

12. The input/output control device according to claim 11, further comprising a cache memory coupled to the storage device through a device interface control unit and a cache memory control unit, wherein the data is prefetched from the storage device to the cache memory based on one of the initial list and the new list.

13. The input/output control device according to claim 11, wherein the initial list is a link list, and the new list is a link list.

14. An input/output control device according to claim 11, wherein:

said memory section comprises:

a common access table recording common sections between at least two different lists, each of said at least two different lists corresponding, respectively, to and including data read requests from a client recorded therein according to an order of generation of the requests; and said input/output control section comprises:

a common access table preparing section preparing a common access table based on said common sections at a specified time interval and inserting into said at least two different lists information referring to said common access table in place of the common sections in said at least two different lists.

15. An input/output control device according to claim 14, wherein said input/output control device is coupled to a storage device, and said input/output control section comprises:

an empty area managing section checking for a continuous empty storage area in the storage device; and a continuous data relocating section continuously writing the data stored in said at least two different lists relating to the common sections in a continuous empty area of said storage device.

16. A method of an input/output control device coupled to computers, said method comprising:

storing an initial list including data read requests from one of the computers recorded therein according to an order of generation of the requests;

determining, by an input/output control section of the input/output control device, whether to add a next data read request from the one of the computers to the initial list corresponding to the one of the computers or to begin a new list, based upon whether the next data read request was made before a specified time had passed since the generation of a previous read request from the same computer; and prefetching data according to one of the initial list and the new list.

17. The method according to claim 16, wherein the data is prefetched from a storage device to a cache memory based on the lists, wherein the storage device is coupled to the cache memory through a device interface control unit and a cache memory control unit.

18. The method according to claim 16, wherein the initial list is a link list, and the new list is a link list.

19. The method according to claim 16, further comprising:

preparing a common access table recording a common section between at least two different lists at a specified time interval and inserting into the at least two different lists information referring to said common access table in place of the common section between the at least two different lists, each of said at least two different lists corresponding, respectively, to and including data read requests from one of the computers recorded therein according to an order of generation of the requests.

20. The method according to claim 19, further comprising:

checking for a continuous empty storage area in a storage device coupled to the input/output control device and writing the data stored in said at least two different lists relating to the common section in the continuous empty area of said storage device in a continuous state.

21. Ah apparatus comprising:

a network;

clients, coupled to the network, each client comprising a computer transmitting data read requests;

a server, coupled to the network, comprising a computer, receiving the data read requests from the clients;

a disk sub-system, coupled to the server, and comprising an input/output control device storing an initial list including the data read requests transmitted from the clients recorded therein according to an order of generation of the requests, said input/output control device comprising an input/output control section determining whether to add a next data read request from one of the clients to the initial list corresponding to the one of the clients or to begin a new list, based upon whether the next data read request was made before a specified time had passed since the generation of a previous read request from the same client, said input/output control device prefetching data according to one of the initial list and the new list.

* * * * *

UNITED STATES PATENT AND TRADEMARK OFFICE
CERTIFICATE OF CORRECTION

PATENT NO. : 6,449,696 B2
DATED : September 10, 2002
INVENTOR(S) : Naoaki Okayasu It is certified that error appears in the above-identified patent and that said Letters Patent is hereby corrected as shown below:

Title page,
Item [57], ABSTRACT,
Line 2, change "method" (second occurrence) to -- apparatus --.

Column 24,
Line 19, change "Ah apparatus" to -- An apparatus --.

Signed and Sealed this

Eighteenth Day of February, 2003

JAMES E. ROGAN
*Director of the United States Patent and Trademark Office*